(12) United States Patent
Aselstyne

(10) Patent No.: US 10,246,591 B1
(45) Date of Patent: Apr. 2, 2019

(54) SECOND COMPONENT FOR A TWO-COMPONENT SPRAYABLE METHYL-METHACRYLATE BASED PAINT AND METHOD OF PRODUCING THEREOF

(71) Applicant: THE BETTER LINE INC., Etobicoke (CA)

(72) Inventor: Alex Aselstyne, Oakville (CA)

( * ) Notice: Subject to any disclaimer, the term of this patent is extended or adjusted under 35 U.S.C. 154(b) by 0 days.

(21) Appl. No.: 15/988,011

(22) Filed: May 24, 2018

(51) Int. Cl.
| | | |
|---|---|---|
| *B05D 1/02* | (2006.01) |
| *C08K 5/07* | (2006.01) |
| *C08K 5/14* | (2006.01) |
| *C09D 4/00* | (2006.01) |
| *C09D 133/12* | (2006.01) |

(52) U.S. Cl.
CPC .............. *C09D 4/00* (2013.01); *C08K 5/14* (2013.01); *C09D 133/12* (2013.01); *B05D 1/02* (2013.01); *C08K 5/07* (2013.01)

(58) Field of Classification Search
CPC ........................ C08K 5/07; C08K 5/14; C09D 133/00–133/26
See application file for complete search history.

(56) References Cited

U.S. PATENT DOCUMENTS

| | | | | |
|---|---|---|---|---|
| 3,637,559 A * | 1/1972 | Pinkney | ................ | C08F 265/06 524/350 |
| 4,593,080 A | 6/1986 | Bouboulis et al. | | |
| 2004/0259990 A1 | 12/2004 | Sonnenschein et al. | | |
| 2005/0027074 A1 | 2/2005 | Lewin et al. | | |
| 2012/0107493 A1* | 5/2012 | Neugebauer | .......... | C08F 220/18 427/137 |
| 2014/0314583 A1* | 10/2014 | Wilkens | .................. | F04B 49/20 417/42 |

FOREIGN PATENT DOCUMENTS

| | | | |
|---|---|---|---|
| CN | 103265854 A | * | 8/2013 |
| CN | 104449196 A | * | 3/2015 |
| CN | 106243890 A | * | 12/2016 |
| KR | 20140087720 A | * | 7/2014 |
| WO | 1998/040424 | | 9/1998 |
| WO | WO-9840424 A1 | * | 9/1998 ............ C08F 283/01 |

OTHER PUBLICATIONS

CN-104449196-A, Mar. 2015, Derwent Ab.*
CN-103265854-A, Aug. 2013, Derwent Ab.*
CN-106243890-A, Dec. 2016, Derwent AB.*
KR-20140087720-A, Jul. 2014, Derwent AB.*
Examiner's Report for Canadian Patent Application No. 3,005,828 by the Canadian Intellectual Property Office; dated Sep. 14, 2018.

* cited by examiner

*Primary Examiner* — Satya B Sastri
(74) *Attorney, Agent, or Firm* — Marc Lampert; Bhole IP Law

(57) ABSTRACT

There is provided a second component, and a method of producing a second component, for a two-component sprayable paint. The sprayable paint can be sprayed in a sprayer apparatus. The first component is methyl-methacrylate. The second component is a mix of: a catalyst for the methyl-methacrylate; and an acetone-based paint. In a particular case, the catalyst is benzoyl-peroxide or dibenzoyl-peroxide. In another case, the acetone-based paint comprises an acrylic copolymer binder.

15 Claims, 2 Drawing Sheets

SECOND COMPONENT FOR A TWO-COMPONENT SPRAYABLE METHYL-METHACRYLATE BASED PAINT AND METHOD OF PRODUCING THEREOF

TECHNICAL FIELD

The following relates to a paint and, more specifically, to a second component for a two-component sprayable methyl-methacrylate based paint and method of producing thereof.

BACKGROUND

In order to put markings on roads, streets, pavement, or other ground surfaces, paint, thermo-set, tape, or thermo-plastic can be applied to the surface. With respect to paint, generally, it comprises three main components: pigments, resins or binders, and water or solvents. In some cases, other materials can be included in the paint mix such as glass beads for retroreflectivity. Pigments are typically ground material that presents colors or shades when light is reflected off them. Resins or binders are generally used to adhere the constituents of the paint and bind the paint to the surface. Resins for solvent-based paints can include, for example, oil (referred to as oil-based paint). Resins for water-based paints can include, for example, polyvinyl acetate latex (PVA) or methyl-methacrylate (MMA). The pigments and resins are mixed with water for water-based paints and with solvents for solvent-based paints; solvents can be, for example, methanol, methylene chloride, and acetone. Due to environmental concerns, various jurisdictions are severely restricting the application of oil-based paints on ground surfaces.

SUMMARY

In an aspect, there is provided a second component for a two-component sprayable paint, the first component comprising methyl-methacrylate, the second component comprising a mix of: a catalyst for the methyl-methacrylate; and an acetone-based paint.

In a particular case, the catalyst is benzoyl-peroxide or dibenzoyl-peroxide.

In another case, the acetone-based paint comprises an acrylic copolymer binder.

In yet another case, the second component comprises between approximately 90% and 20% of catalyst by volume.

In yet another case, the second component comprises between approximately 80% and 30% of catalyst by volume.

In yet another case, the second component comprises between approximately 80% and 50% of catalyst by volume.

In yet another case, the second component comprises approximately 80% of catalyst by volume.

In yet another case, the second component comprises approximately 2% of the weight of the two-component sprayable paint.

In yet another case, there is provided a use of the second component in a sprayer apparatus for spraying the two-component sprayable paint, the first component and the second component retrieved from separate containers and combined prior to being sprayed at a sprayer nozzle of the sprayer apparatus.

In another aspect, there is provided a method for producing a second component for a two-component sprayable paint, the first component comprising methyl-methacrylate, the method comprising: providing a catalyst for the methyl-methacrylate; providing a diluent comprising an acetone-based paint; mixing the catalyst with the diluent to produce a second component for a two-component sprayable paint.

In a particular case, the catalyst is benzoyl-peroxide or dibenzoyl-peroxide.

In another case, the acetone-based paint comprises an acrylic copolymer binder.

In yet another case, the catalyst is mixed to the diluent such that the catalyst is between approximately 90% and 20% of catalyst by volume.

In yet another case, the catalyst is mixed to the diluent such that the catalyst is between approximately 80% and 30% by volume.

In yet another case, the catalyst is mixed to the diluent such that the catalyst is between approximately 80% and 50% by volume.

In yet another case, the catalyst is mixed to the diluent such that the catalyst is approximately 80% by volume.

In yet another case, the second component is produced such that the second component comprises approximately 2% of the weight of the two-component sprayable paint.

A method for spraying a two-component sprayable paint with a sprayer apparatus, the method comprising: providing a first component into a first container of the sprayer apparatus, the first component comprising methyl-methacrylate; providing a second component into a second container of the sprayer apparatus, the second component comprising a mix of catalyst for the methyl-methacrylate and an acetone-based paint; engaging the sprayer apparatus such that the first component and second component are retrieved from their respective containers and combined prior to being sprayed at a sprayer nozzle of the sprayer apparatus.

In a particular case, the catalyst is benzoyl-peroxide or dibenzoyl-peroxide.

In another case, the acetone-based paint comprises an acrylic copolymer binder.

These and other aspects are contemplated and described herein. It will be appreciated that the foregoing summary sets out representative aspects of systems and methods to assist skilled readers in understanding the following detailed description.

DESCRIPTION OF THE DRAWINGS

The features of the invention will become more apparent in the following detailed description in which reference is made to the appended drawings wherein.

DETAILED DESCRIPTION

Figure 1:
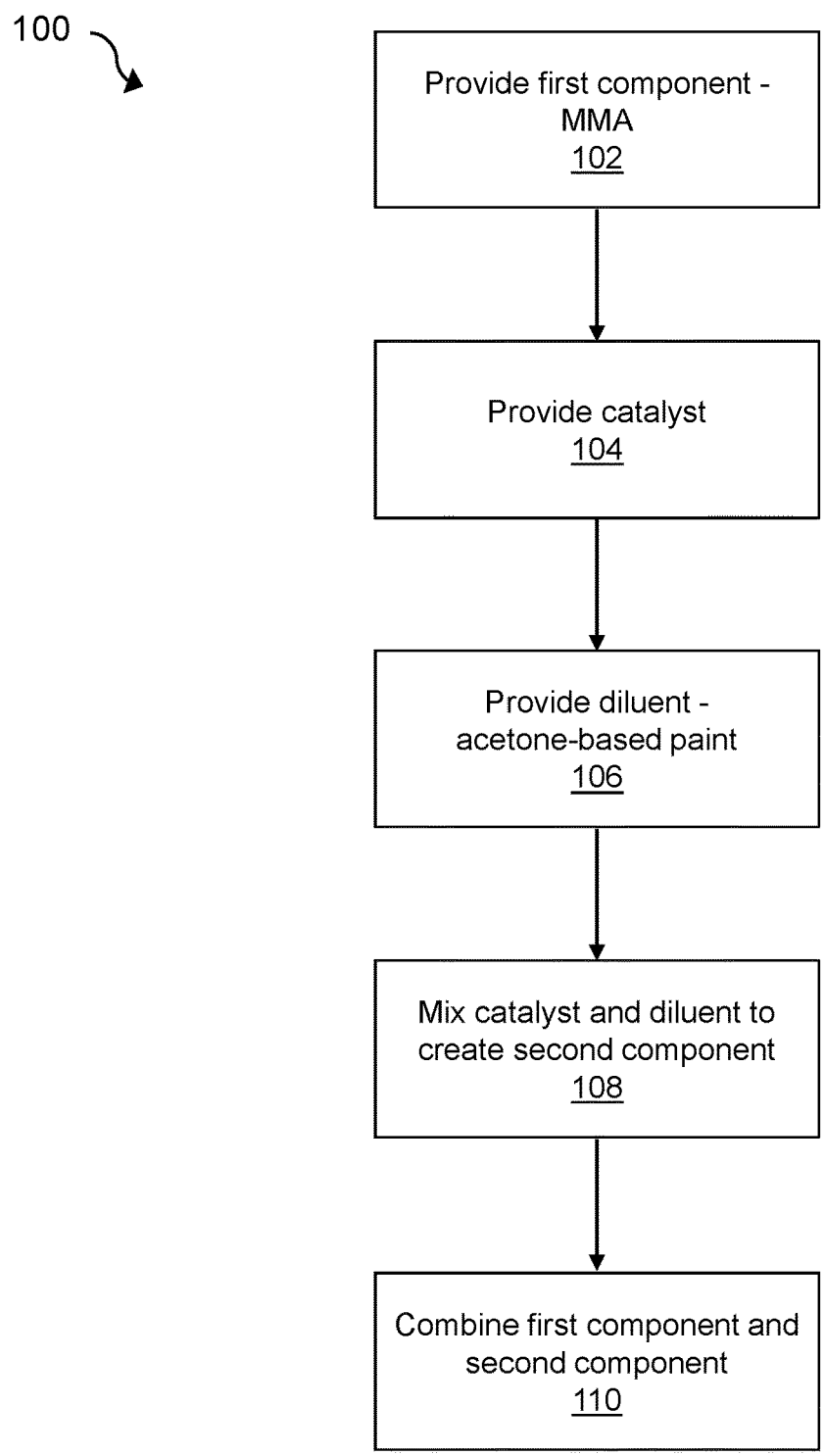
FIG. 1 is a flow chart of a method for producing a second component for a two-component sprayable paint, in accordance with an embodiment.

For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative", "exemplifying" or "serving as an example, instance, or illustration," and not necessarily as "preferred" over other embodiments; the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components; the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure. Further definitions for terms may be set out herein; these may apply to prior and subsequent instances of those terms, as will be understood from a reading of the present description.

The following relates to a paint and, more specifically, to a second component for a two-component sprayable methyl-methacrylate based paint and method of producing thereof.

Generally, efficiently applying paint to a road, street, pavement, or other ground surface involves using an appropriate painting apparatus. Such apparatus can include, for example, walk behind systems, systems that are pulled on trailers, or systems that are built on vehicle chassis. In general, these systems apply paint to the ground surface by spraying the paint on the surface, for example with a dual displacement pump system, or extruding the paint onto the surface. In some cases, a stencil can be used to produce an exact shape or marking.

In the case of oil-based paint, a sprayer apparatus is generally used as an effective and efficient way to apply paint to the ground surface. However, increasingly, jurisdictions are restricting or banning the use of oil-based ground surface paints for environmental concerns. As an alternative to oil-based paints, water-based paints with methyl-methacrylate (MMA) resin (referred to herein as "MMA paint") is a durable and popular replacement.

MMA paint is a two-part paint with methyl-methacrylate mixed with a catalyst, typically benzoyl-peroxide, generally just prior to application of the paint. A common mixture ratio is 98:2 of methyl-methacrylate (MMA) to liquid benzoyl-peroxide (BPO) by weight (referred to as "98:2 MMA paint"). However, other ratios are possible; for example, 50:50 of MMA to BPO.

While the properties of MMA paint mean that it has become a popular replacement to oil-based paint, MMA paint typically does not function well in a sprayer apparatus.

In a 98:2 MMA paint sprayer, the liquid BPO is put under pressure, heat and shear stresses in the dual displacement pump that cause the liquid BPO to decompose and/or change state from liquid to a solid. Due to the properties of BPO, for example due to it possibly being a non-Newtonian fluid, this change has been found to cause the BPO pump to "hard pack" and become incapable of pumping catalyst into the paint mixture. Thus, resulting in an inability to apply the paint to the ground surface properly.

In some circumstances, as long at the liquid BPO is moving through the pump, it may remain liquid and not hard pack. However, as soon as the sprayer does not call for any more spray, the BPO pump will typically stop and thus the liquid BPO stops moving. It has been determined that, generally, within 7 seconds of having been stopped, the liquid BPO can begin to hard pack making the sprayer inoperable. In practice, this is not acceptable and causes enormous inefficiencies. For example, every time an operator of the sprayer comes to the end of a parking line and has to stop spraying until they go to a next parking line, the sprayer is likely to become inoperable due to hard packing. Then the operator would likely have to take the BPO pump apart, thoroughly clean the pump, and rebuild it. Obviously, this can cause massive delays, downtime, inefficiencies, and sunken costs.

In an attempt to alleviate the hard packing problem, the Applicant experimented with a number of different approaches. For example, an approach of pressure relief for the BPO pump was devised between stops and starts of the sprayer apparatus. In this approach, pressure in the BPO pump is released immediately after spraying has stopped; typically, within the seven seconds it generally takes for hard packing to occur. Pressure would be released completely from the BPO pump and then pressure would have to be built back up when ready to paint the next ground surface section. This repetitive process of releasing and rebuilding pressure in the BPO pump to avoid the hard packing problem is tremendously inefficient. This approach was found to cause large delays, untypical operator fatigue, inconsistency of the BPO and MMA mix resulting in poor cure of paint, and increased wear and tear on the sprayer.

In another approach, the Applicant experimented with packing dry ice around sections of the BPO pump to lower the temperature of the liquid BPO enough that it would not hard pack. While this alleviated the need to release and build-up pressure of the BPO pump, it was determined to be nonetheless cumbersome and inefficient. Generally, in this approach dry ice has to be purchased every single day that the sprayer is used. Dry ice is particularly dangerous if it comes in to contact with bare skin of the operator. Additionally, if the operator forgets to replenish the dry ice around the BPO pump during operation, the liquid BPO would hard pack and the BPO pump would have to be taken apart, cleaned and rebuilt. This approach was determined to be inefficient, unreliable, and not sufficiently mistake-proof.

In embodiments of the present disclosure, a reliable and efficient MMA paint composition was determined to overcome the hard packing problem. In an embodiment, methyl-methacrylate based paint comprises a first component comprising methyl-methacrylate (MMA) and a second component comprising benzoyl-peroxide (BPO) and an acetone-based paint. In a particular case, the acetone-based paint having an acrylic copolymer binder.

It is contemplated that the ratio between the benzoyl-peroxide (BPO) and the acetone-based paint in the second component can have any suitable value; affecting the cure time accordingly. In a preferable case, the ratio of BPO by volume in the second component is between 90% and 20%; even more preferably, the second component has more BPO by volume than acetone-based paint. In a most-preferable case, for the second component, BPO can be mixed with the acetone-based paint having an acrylic binder in a ratio of approximately 80:20 of BPO to acetone-based paint by volume. At this ratio, depending on the circumstances of application, the cure time when combined with the first component is approximately five minutes. In another exemplary case, for the second component, BPO can be mixed with the acetone-based paint having an acrylic binder in a ratio of approximately 30:70 of BPO to acetone-based paint by volume. At this ratio, depending on the circumstances of application, the cure time when combined with the first component is approximately forty minutes.

The MMA paint of the present embodiments can be a 98:2 MMA paint, having a ratio of 98:2 of the first component to the second component by weight. Generally, in this case, the BPO is liquid and mixed with the MMA just prior to spraying. Thus, generally providing safer circumstances of use. In further embodiments, other ratios of MMA paint can be used.

In a further case, the acetone-based paint can have further constituents mixed in. In an example, the acetone-based paint can be approximately, by weight, 0.9% ethylbenzene, 5% xylene, 24% acetone, 0.3% quartz, 50% calcium carbonate, and 4% titanium dioxide.

Advantageously, the Applicant experimentally determined that by mixing the liquid BPO with acetone-based paint, the liquid BPO sufficiently changes its chemical makeup to adequately stop the hard packing. Additionally, the second component approximately maintains its full catalytic properties to ensure a proper and reliable cure of the MMA paint when combined with the first component.

Thus, it was determined that when using the MMA paint composition of the present embodiments in a sprayer apparatus, the hard packing problem can be overcome. Advantageously, this can allow for a consistent, reliable, and efficient spray of MMA paint with a sprayer apparatus. This can result in much lees operator fatigue, more people can be operators without as much training, and sprayers using MMA paint can have wider application.

Turning to FIG. 1, a method 100 of producing a sprayable methyl-methacrylate based paint is shown, in accordance with an embodiment. At block 102, providing a first component comprising methyl-methacrylate (MMA). In some cases, the first component can already be provided. At block 104, providing a catalyst for the methyl-methacrylate. At block 106, providing a diluent comprising an acetone-based paint. At block 108, mixing the catalyst and the diluent to produce a second component. At block 110, combining the first component and the second component as a sprayable paint prior to spraying of the sprayable paint.

In an embodiment, for use in a sprayer apparatus, the first component can be loaded into a material container tank of the sprayer and the second component can be loaded in the catalyst tank of the sprayer. The two components can be atomized and combined at or before the spray nozzle during operation of the sprayer.

Figure 2:
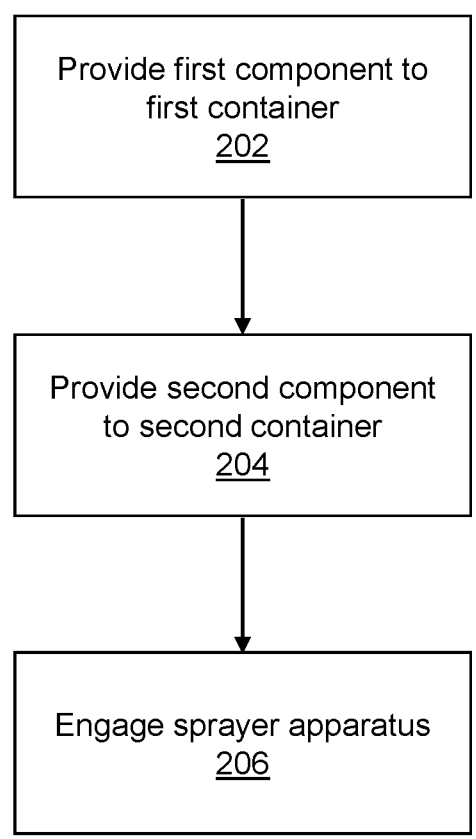
FIG. 2 is a flow chart of a method for spraying a two-component sprayable paint with a sprayer apparatus, in accordance with an embodiment.

Turning to FIG. 2, a method 200 for spraying a two-component sprayable paint with a sprayer apparatus is shown. At block 202, providing a first component into a first container of the sprayer apparatus, the first component comprising methyl-methacrylate. At block 204, providing a second component into a second container of the sprayer apparatus, the second component comprising a mix of catalyst for the methyl-methacrylate and an acetone-based paint. At block 206, engaging the sprayer apparatus such that the first component and second component are retrieved from their respective containers and combined prior to being sprayed at a sprayer nozzle of the sprayer apparatus. In a particular case, the catalyst is benzoyl-peroxide or dibenzoyl-peroxide. In another particular case, the acetone-based paint comprises an acrylic copolymer binder.

While the catalyst in the embodiments described herein is benzoyl-peroxide, other similar catalysts are contemplated; for example, dibenzoyl-peroxide, methyl-ethyl-ketone-peroxide, or the like.

In an example of the advantages of the embodiments described herein, various government, including Canada, are recognizing the detrimental environmental impact of painting ground surfaces with volatile organic compounds (VOCs) and prohibited their use accordingly, For example, Canada has prohibited road surface paint with VOCs having a release rate of higher than 450 grams-per-liter. In effect, this means that many environmentally negative oil-based traffic paints can no longer be used. Thus, for road painting, environmentally safe options are typically either water-based paint or methyl-methacrylate (MMA) based paint. However, water-based paint can have insufficient durability and required substantial repainting as a result, In contrast, MMA paint is typically much more durable and has a VOC rating of, for example, only 50 grams per liter. Thus, MMA paint is much more environmentally beneficial as not only is it releasing a third as many VOCs, but such release is typically required less times in a given period of time.

However, as described herein, MMA paint can have adoption issues because it is not easily applied to road surfaces due to the hard-packing issue. Advantageously, the present embodiments provide a solution to allow for wider adoption of MMA paint by allowing it to be sprayed in a sprayer apparatus. Thus, helping to resolve or mitigate environmental impacts of harmful oil-based paint or repetitive releasing of VOCs from non-durable water-based paint.

As an example, a traffic arrow on a roadway spray painted with water-based or acetone-based paint will typically need to be repainted at least six times in a 3-year period. If that arrow takes approximately 2 liters of paint, there will be 150×2×6=1800 grams of VOCs released into the environment during that timespan. In contrast, using the present invention, it can be spray painted typically once in the 3 year period. Thus, if 50 grams per liter of VOCs are released, there will be 50 grams×2 liters×once per year=100 VOCs released, instead of 1800. Extrapolated widely to large scale road surface paintings, this provides a potentially massive beneficial environmental impact.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A second component for a two-component sprayable paint, the first component comprising methyl-methacrylate, the second component comprising a mix of:
   a catalyst for the methyl-methacrylate; and
   an acetone-based paint comprising an acrylic copolymer binder, wherein the second component comprises between 90% and 20% of catalyst by volume.

2. The second component of claim 1, wherein the catalyst is benzoyl-peroxide or dibenzoyl-peroxide.

3. The second component of claim 1, wherein the second component comprises between approximately 80% and 30% of catalyst by volume.

4. The second component of claim 3, wherein the second component comprises between approximately 80% and 50% of catalyst by volume.

5. The second component of claim 4, wherein the second component comprises approximately 80% of catalyst by volume.

6. The second component of claim 1, wherein the second component comprises approximately 2% of the weight of the two-component sprayable paint.

7. A method for producing a second component for a two-component sprayable paint, the first component comprising methyl-methacrylate, the method comprising:
   providing a catalyst for the methyl-methacrylate;
   providing a diluent comprising an acetone-based paint, the acetone-based paint comprising an acrylic copolymer binder;
   mixing the catalyst with the diluent to produce a second component for a two-component sprayable paint, wherein the catalyst is mixed to the diluent such that the catalyst is between approximately 90% and 20% of catalyst by volume.

8. The method of claim 7, wherein the catalyst is benzoyl-peroxide or dibenzoyl-peroxide.

9. The method of claim 7, wherein the catalyst is mixed to the diluent such that the catalyst is between approximately 80% and 30% by volume.

10. The method of claim 7, wherein the catalyst is mixed to the diluent such that the catalyst is between approximately 80% and 50% by volume.

11. The method of claim 7, wherein the catalyst is mixed to the diluent such that the catalyst is approximately 80% by volume.

12. The method of claim 7, wherein the second component is produced such that the second component comprises approximately 2% of the weight of the two-component sprayable paint.

13. A method for spraying a two-component sprayable paint with a sprayer apparatus, the method comprising:
   providing a first component into a first container of the sprayer apparatus, the first component comprising methyl-methacrylate;
   providing a second component into a second container of the sprayer apparatus, the second component comprising a mix of catalyst for the methyl-methacrylate and an acetone-based paint;
   engaging the sprayer apparatus such that the first component and the second component are retrieved from their respective containers and combined prior to being sprayed at a sprayer nozzle of the sprayer apparatus.

14. The method of claim 13, wherein the catalyst is benzoyl-peroxide or dibenzoyl-peroxide.

15. The method of claim 14, wherein the acetone-based paint comprises an acrylic copolymer binder.

* * * * *